United States Patent Office
3,363,972
Patented Jan. 16, 1968

3,363,972
PROCESS FOR DYEING AND PRINTING NATURAL NITROGEN-CONTAINING FIBROUS MATERIALS
Paul Ulrich, Basel, and Hans Niederer, Binningen, Basel-Land, Switzerland, assignors to Ciba Limited, Basel, Switzerland, a Swiss company
No Drawing. Filed Jan. 27, 1964, Ser. No. 340,556
Claims priority, application Switzerland, Jan. 25, 1963, 934/63
32 Claims. (Cl. 8—54)

The present invention relates to the coloring, i.e. dyeing and printing of natural nitrogen-containing fibrous material with dyestuffs that are soluble or dispersible in water, the material to be dyed being impregnated with an aqueous preparation having a temperature within the range from 15 to 40° C. and containing at least 5%, referred to the weight of the preparation, of at least one compound of the formula

where D represents oxygen, sulfur or NH; Y stands for a primary, secondary or tertiary amino group or O⁻ or S⁻, and Z represents a primary, secondary or tertiary amino group, an alkyl, alkoxy or aryl group—and the material treated in this manner is stored in the moist state for at least one hour at 15 to 40° C. The present process is suitable for dyeing and printing a very wide variety of natural nitrogen-containing materials, inter alia leather, skins (for example sheepskins), hairs, such as hairs of humans, goats, rabbits or hares, feathers, sisal (which contains proteinic products embedded in cellulose) and silk. Particularly valuable results are achieved in dyeing wool.

The dyestuffs to be used in the present process may be soluble or only dispersible in water.

As water-soluble dyestuffs those are preferred which owe their solubility in water to the presence of acid groups, such as carboxylic acid groups, or more especially of sulfonic acid groups or acid sulfuric acid ester groups. They may, but need not, be reactive with respect to the fibrous material to be dyed and may belong to a wide variety of classes, such as to the oxazine, triphenylmethane, xanthene, nitro, acridone or phthalocyanine dyestuffs, and especially the metallized, metal-free or metallisable monoazo or polyazo dyestuffs, or to the anthraquinone dyestuffs. As representatives of the dyestuffs containing acid sulfuric acid ester groups there may be mentioned the indigosoles. Apart from indigosoles there may also be used vat dyestuffs in the water-soluble oxidized state or in the form of their water-soluble leuco compounds for the performance of the present process.

The term "reactive dyestuffs belonging to a wide variety of classes" describes dyestuffs that are capable of entering with the material to be dyed a chemical, i.e. covalent bond. In this connection there may be mentioned as groupings capable of imparting this property to the dyestuff: epoxide groups, ethylene-imine groups, isocyanate, isothiocyanate, carbamic acid aryl ester groups, the propiolic acid amide grouping, mono- chloro- and dichlorocrotonylamino, chloroacrylamino groups, acrylamino groups that contain groupings comprising a labile substituent and are easy to split while entraining the bond electron pair, for example, sulfohalide groups, aliphatically bound sulfuric acid ester and sulfonyloxy groups and halogen atoms, more especially an aliphatically bound chlorine atom, or the vinylacyl groups, for example the vinylsulfone groups and the carboxyvinyl group. These labile substituents are advantageously in the γ-position or β-position of an aliphatic radical which is bound to the dyestuff molecule directly or through an amino, sulfone or sulfonamide group; in the case of those relevant dyestuffs which contain as labile substituent a halogen atom such mobile halogen atoms may also be present in an aliphatic acyl radical, for example in an acetyl radical, or in position β or α and β of a propionyl or acryl radical, or in a heterocyclic radical, for example in a pyrimidine, pyridazine or triazine ring. The dyestuffs contain advantageously a grouping of the formula

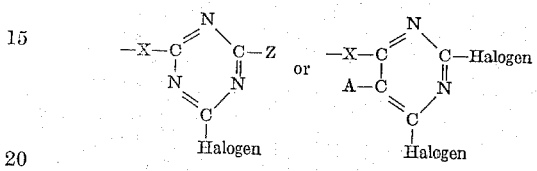

where X represents a nitrogen bridge and Z a hydrogen atom, a possibly substituted amino group, an etherified hydroxyl or mercapto group or a halogen atom or an alkyl, aryl or aralkyl group, and A stands for a hydrogen or halogen atom. The halogen atoms are, for example, bromine or preferably chlorine atoms.

Further suitable reactive groupings are the following radicals: Trichloropyrazine, dichloroquinoxaline, dichlorobutene, halogenated pyridazone, sulfonic acid dichloropropylamide, allylsulfone, allylsulfide, 2-halogenbenzthiazolecarbamide and β-sulfato-propionic acid amide radicals.

There may also be mentioned reactive onium dyestuffs that contain, for example, instead of a reactive halogen atom, a reactive ammonium or hydrazinium radical.

Suitable dyestuffs dispersible in water are those which are insoluble in water but form in water in the finely ground state very fine dispersions, at least with the aid of dispersants. From these suspensions the dyestuffs produce very durable dyeings, especially on pelts.

The aqueous preparations of the invention must contain at least one compound of the formula

where D represents oxygen, sulfur or NH, Y stands for a primary, secondary or tertiary amino group, O⁻ or S⁻, and Z represents a primary, secondary or tertiary amino group, and alkyl, alkoxy or aryl group. Among these compounds those of the formulae

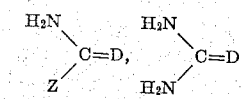

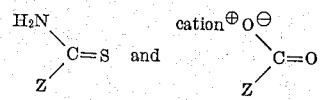

where D and Z have the above meanings—are preferred.
The compounds of the formula

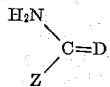

are compounds of urea, thiourea or guanidine, or aliphatic and aromatic acylamides, thioacylamides or amidines, or urethanes or thiourethanes. Among these the compounds of sulfur, i.e. compounds of the formula

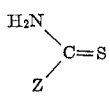

produce especially valuable results. There may be mentioned as relevant examples thiosemicarbazide, allylthiourea, and above all thiourea and thioacetamide.

Valuable results are also obtained with the oxygen compounds of the formula

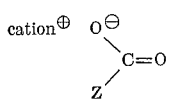

more especially when Z represents a radical containing up to 6 carbon atoms, and in this connection it has been observed that cyclic radicals, such as the phenyl group, are especially valuable. Such compounds are, for example, the watersoluble salts of benzoic acid, such as sodium benzoate.

It is also possible for the radicals Y and Z to be linked together so that they form cyclic compounds; relevant examples are hydantoin and urazile.

The above-mentioned compounds may be used in widely varying proportions, but they should not be smaller than 5% and in general no larger than 50%, calculated on the weight of the whole aqueous preparation. Preferred amounts vary from 15 to 30%. The compounds to be used may also be combined with each other. It is also possible to apply the dyestuffs and chemicals required for the performance of the present process to the substrate in two separate operations; thus, for example, a wool fabric may first be padded with the dyestuff solution and then slop-padded with the separately prepared chemical bath. The procedure may also be reversed, first performing the impregnating with the chemical bath and then slop-padding the fabric with the dyestuff solution.

In addition to the compounds required according to the invention the aqueous preparations may contain the conventional dyeing and printing additives, for example surface-active anionic or non-ionic assistants, thickeners, and also electrolytes, acids or bases. When adding a thickener it must first be ensured that it is compatible with the liquor, that is to say, depending on whether the liquor is of acid or alkaline reaction, a suitable thickener must be used.

Furthermore, the dyeing preparations may contain hydrophilic compounds that are at most restrictedly soluble in water, such, for example, as n-butanol or benzyl alcohol. When reactive dyestuffs are used, it is also possible to add compounds that influence the reaction of the dyestuff with the fiber; thus, by adding, for example, a tertiary amine or a hydrazine compound containing at least one tertiary nitrogen atom, the time of reaction between dyestuff and fiber may be shortened and/or the reaction temperature may be lowered and/or stronger dyeings and prints can be produced, or the hydrolysis resistance of delicate reactive dyestuffs can be enhanced.

It has proved particularly advantageous to add a coacervating substance, that is to say a compound capable of forming a two-phase system with water. Both phases, i.e. the phase richer in assistant and the phase poorer in assistant, contain water as solvent. Such substances may belong to a wide variety of compounds so that, in this context, merely the phenomenon of coacervation as such is mentioned which is easy to demonstrate in a test tube and then under a microscope.

When the dyeing preparation further contains a textile protective agent, which deposits on the fibers like a wool dyestuff, the material to be dyed can at the same time be protected from attacks by textile pests. A list of relevant textile protective agents was published by H. Martin in Chimica 12, pages 191 to 215 [1958] and in Textilerundschau, numbers 8 and 10 [1958].

The present process is suitable for dyeing or printing natural nitrogenous fibrous materials. The dyeing may be performed according to the exhaustion method or by impregnation, that is to say on a padder. Printing procedure may likewise follow the usual methods, and is particularly advantageously performed by way of slub printing. The aqueous preparations should be used at temperatures from 15 to 40° C., preferably from 25 to 35° C.

Following upon the treatment with the dyeing preparation the material is stored in a manner such that the preparation cannot dry on the material; this is advantageously ensured by wrapping the material in a plastic foil or keeping it in a closed container or closed room. The temperature at which the material is stored may vary from 15 to 40° C. and is preferably within the range of 25 to 35° C. The storage period may vary within very wide limits, but it should not be less than 1 hour and not more than 48 hours. As a rule, a storage period of 10 to 20 hours will produce favorable results. For finishing off the dyed or printed material it is in general sufficient to rinse it thoroughly in cold and then in hot water.

Especially delicate materials, for example feathers, are preferably dyed by the exhaustion method. In this case the storage in the moist state can be dispensed with: Instead of storing the material outside the bath it is left to itself inside the dyebath for a period equivalent to the external storage period.

The special advantage of the process of the invention is above all that it can be performed in the cold, more especially when woollen fabrics or loose wool are continuously dyed or printed. Accordingly, the present process is not only very efficient and distinctly mild but also capable of performance with simple apparatus, and the amount of heat consumed is advantageously small.

Unless otherwise indicated, parts in the following examples are by weight.

*Example 1*

30 parts of the dyestuff of the formula

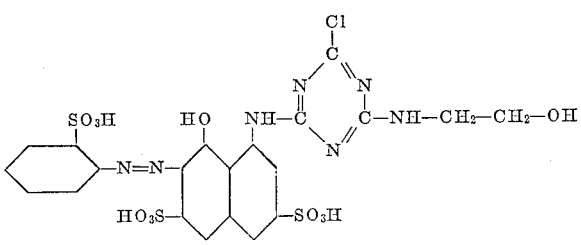

are dissolved together with 500 parts of urea in 300 parts of boiling water, cooled to 25 to 30° C. and then made up with cold water to 1000 parts by volume.

A woollen fabric is padded with this liquor, immediately reeled and kept in this state for 14 hours in a closed container or wrapped in a plastic foil at 30° C. After this storage the unfixed portion of the dyestuff is removed by a thorough rinse in cold and then in hot water.

The resulting red dyeing has good fastness properties and is considerably deeper than when dyeing is performed in the absence of urea.

Similar results are obtained when a nonionic or anionic wetting agent is added to the padding liquid, for example 0.5 to 4 parts of the adduct of 8 mols of ethylene oxide with 1 mol of para-tertiary octylphenol or sodium diisobutyl-naphthalenesulfonate.

Similar results are also obtained by adding a coacervating agent to the padding liquor. Thus, there may be added with good effect, for example, 40 parts of a condensation product of 1 mol of coconut oil fatty acid with 2 mols of diethanolamine, or 40 parts of the acid sulfuric acid ester of the adduct of 2 mols of ethylene oxide with 1 mol of para-tertiary nonylphenol.

Similar good results are also obtained when the two above-mentioned assistants are combined in the indicated proportions.

*Example 2*

30 parts of the dyestuff of the formula

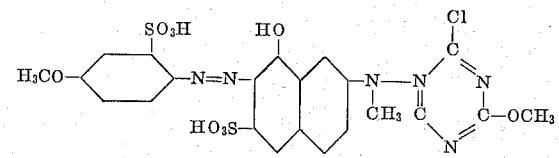

are dissolved in 400 parts of boiling water together with 200 parts of thiourea, 10 parts of a 25% aqueous solution of the adduct of 8 mols of ethylene oxide with 1 mol of para-tertiary octylphenol and 40 parts of the acid sulfuric acid ester of the adduct of 2 mols of ethylene oxide with 1 mol of para-tertiary nonylphenol. On completion of the dissolution the whole is made up with cold water to 1000 parts by volume.

A woollen fabric is padded with this liquor (heated at 40° C.) until a weight increase of 75% has been achieved, then immediately reeled and in this state stored for 14 hours at 30° C. After this storage the unfixed portion of dyestuff is removed by a thorough rinse in cold and then in warm water.

A fast scarlet dyeing is obtained which is of considerably greater tinctorial strength than when dyeing is performed without adding the assistants.

Similar good results are obtained when thiourea is replaced by identical amounts of one of the following compounds: Sodium benzoate, thioacetamide, allylthiourea, dicyandiamide, tetramethyl-thiourea, biuret or thiosemicarbazide.

The dyestuff used in this example may be replaced by any one of the following dyestuffs:

| No. | Formula | Shade |
|---|---|---|
| 1 | | Red. |
| 2 | | Red. |
| 3 | | Yellow. |
| 4 | | Blue. |

| No. | Formula | Shade |
|---|---|---|
| 5 | [structure: naphthalene with SO₃H, HO, N=N to benzene-SO₃H, HO₃S, SO₃H, NH-C to triazine with Cl, Cl] | Red. |
| 6 | [structure: benzene with SO₂-CH₂-CH₂-O-SO₂OH, HO₃S, N=N to naphthalene with HO, NHCOCH₃] | Orange-red. |
| 7 | [structure: phenyl-NH-C(triazine with Cl)-NH-C-N=C-C=N pyrazolone with CH₃, OH, N-phenyl with CH₃, Cl; SO₃H on middle phenyl] | Yellow. |
| 8 | H₃C—O—CH₂—CH₂—NH—C(triazine-Cl)—NH—phenyl(SO₃N)—N=N—naphthalene(NH₂, HO)—N(phenyl)—SO₂—CH₃ | Scarlet. |
| 9 | Cu—Pc—(3)— { —(SO₃H)₂,₅ ; —(SO₂—NH—CH₂—CH₂—Cl)₁,₅ } (Cu—Pc=residue of copper phthalocyanine) | Turquoise. |
| 10 | [structure: benzene-SO₃H, N=N to naphthalene with HO, HO₃S, SO₃H, NH—CO—quinoxaline with 2 Cl and 2 N] | Red. |
| 11 | [anthraquinone with NH₂, SO₃H, NH-phenyl(SO₃H)-NH—CO—CH₂—CH₂—Cl] | Blue. |
| 12 | [structure: phenol with OH, N=N to pyrazolone C—N—phenyl, CH₃, HO; SO₂—NH—CH₂—CH₂—O—SO₂OH] 1:2-cobalt complex | Yellowish brown. |

| No. | Formula | Shade |
|---|---|---|
| 13 | 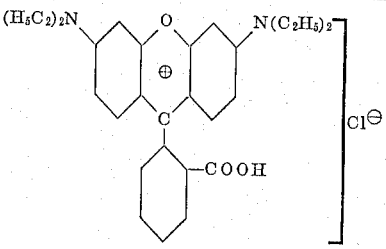 | Red. |

Example 3

30 parts of the dyestuff of the formula

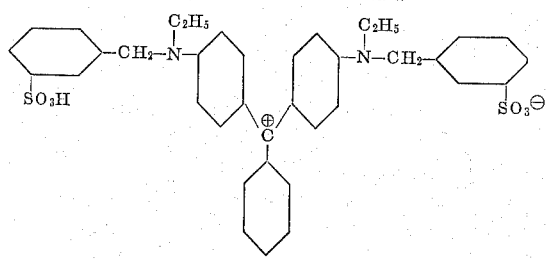

are dissolved in 400 parts of boiling water together with 200 parts of thiourea, 10 parts of the adduct of 8 mols of ethylene oxide with 1 mol of para-tertiary octylphenol and 40 parts of the acid sulfuric acid ester of the adduct of 2 mols of ethylene oxide with 1 mol of para-tertiary nonylphenol. 5 parts of 85% formic acid are then added and the batch is made up to 1000 parts by volume with cold water.

A woollen fabric is padded with this liquor (which has been heated to 40° C.) to a weight increase of 75%, then immediately reeled and stored in this state for 14 hours at 30° C. After this storage the unfixed portion of dyestuff is removed by a thorough rinse in cold and then in warm water.

The resulting green shade is of substantially greater tinctorial strength than when the assistants are omitted.

Similar good results are obtained when thiourea is replaced by equal parts of sodium benzoate, thioacetamide, thiosemicarbazide, allylurea or dicyandiamide.

Instead of the dyestuff mentioned above there may be used equal parts of the chromium complex containing per atomic proportion of chromium one molecule of the dyestuff of the formula

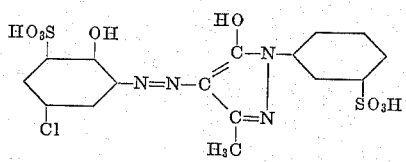

and instead of formic acid 5 parts of 96% sulfuric acid. In this manner a fast red dyeing is obtained which is substantially deeper than when dyeing is performed without adding the assistants.

Example 4

30 parts of the dyestuff of the formula

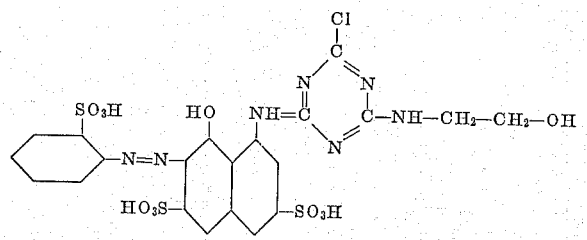

are dissolved in 400 parts of boiling water together with 200 parts of thiourea, 10 parts of the adduct of 8 mols of ethylene oxide with 1 mol of para-tertiary octylphenol and 40 parts of the acid sulfuric acid ester of the adduct of 2 mols of ethylene oxide with 1 mol of para-tertiary nonylphenol. When dissolution is complete the whole is made up to 1000 parts by volume with cold water.

Wool slubbings are padded with this liquor, stored for 14 hours at 25° C. in a closed container, and then vigorously rinsed in cold and then in warm water.

The slubbing is dyed a red shade of greater tinctorial strength than when dyeing is performed in the absence of thiourea.

Example 5

Pure wool slubbings are printed on a slubbing printing machine to produce 50% coverage. The impregnating liquor contains the following ingredients:

20 parts of the dyestuff of the formula

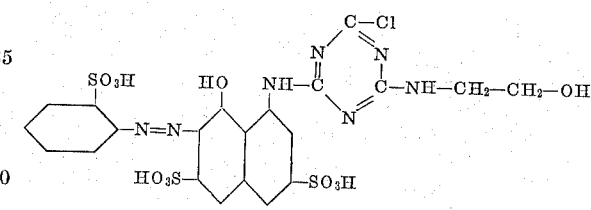

10 parts of etherified carubic acids
40 parts of the acid sulfuric acid ester of the adduct of 2 mols of ethylene oxide with 1 mol of para-tertiary nonylphenol
10 parts of a 25% aqueous solution of the adduct of 8 mols of ethylene oxide with 1 mol of para-tertiary octylphenol
200 parts of thioacetamide
720 parts of water 1000 parts The impregnated slubbings are stored for 14 hours at 30° C. and a relative atmospheric humidity of 100%, then vigorously rinsed in cold and in hot water.

The slubbings are printed a red shade and the printed areas display a much greater tinctorial strength than when thioacetamide is omitted.

Thioacetamide may be replaced by equal parts of dicyandiamide or tetramethyl thiourea.

Example 6

A padding liquor is prepared from 30 parts of the sulfuric acid leuco ester of the dyestuff of the formula

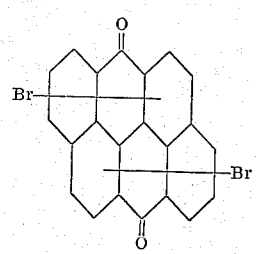

10 parts of a 25% aqueous solution of the adduct of 8 mols of ethylene oxide with 1 mol of para-tertiary octylphenol
40 parts of the acid sulfuric acid ester of the adduct of 2 mols of ethylene oxide with 1 mole of para-tertiary nonylphenol and
200 parts of thiourea, dissolved in
400 parts of boiling water.

The solution thus obtained is then diluted with cold water to 100 parts by volume.

A woolen fabric is padded with this solution (heated at 40° C.) to a weight increase of 75%, then immediately reeled and stored in this state for 14 hours at 30° C.

After storing, the dyeing is developed for 1 minute at 50° C. in a bath containing per 1000 parts of water 5 parts of sodium nitrite and 10 parts of 96% sulfuric acid and then thoroughly rinsed in cold and in hot water.

The resulting, fast yellow dyeing is of much greater tinctorial strength than when dyeing is performed in the absence of thiourea.

Similar good results are obtained when the above dyestuff is replaced by the sulfuric acid leuco esters of the dyestuffs of the following formulae:

| | |
|---|---|
| 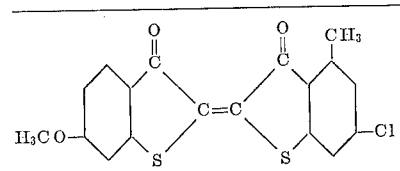 | Scarlet. |
| 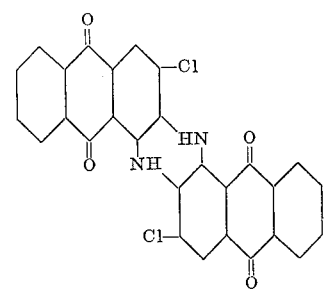 | Blue. |
| or 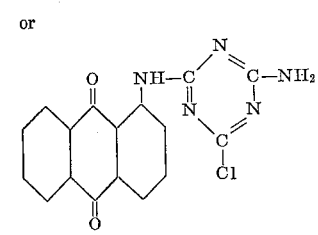 | Yellow. |

*Example 7*

30 parts of the dyestuff of the formula

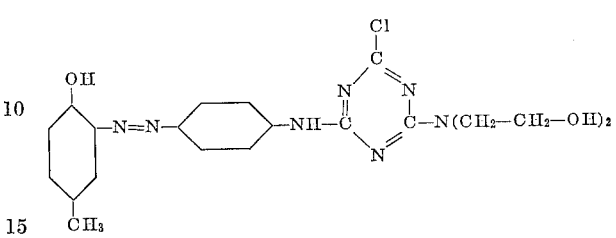

are dissolved in 300 parts of water together with 200 parts of thiourea and 500 parts of ethyleneglycol monomethyl ether, and the whole is diluted with water to 1000 parts by volume.

A woollen fabric is padded with this liquor to a weight increase of 75%, then immediately reeled and stored in this state for 14 hours at 30° C. After this storage the unfixed portion of dyestuff is removed by a thorough rinse in cold and then in hot water.

The resulting yellow shade is of much greater tinctorial strength than when dyeing is performed without adding the assistants.

Similar good results are obtained with the dyestuff of the formula

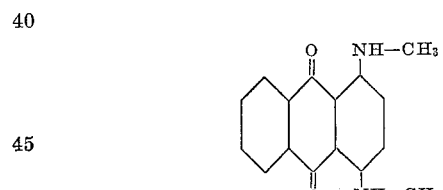

*Example 8*

30 parts of the dyestuff of the formula

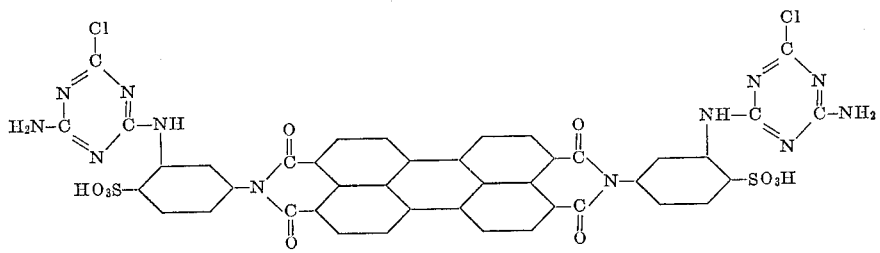

are dissolved in 300 parts of boiling water together with 200 parts of thiourea. When all has passed into solution, 50 parts of sodium sulfide in 400 parts of water are added and the whole is diluted with water to 1000 parts by volume.

This liquor is heated to 40° C. and used for padding a woollen fabric which is then immediately reeled and stored in this state for 14 hours in a closed container, or wrapped in a plastic foil, at 30° C. After this storage the unfixed portion of the vat is removed by a thorough rinse in cold and then in hot water. The rinsed dyeing is then oxidized in a bath at 40° C. containing hydrogen peroxide or sodium perborate and finally soaped hot.

The resulting fast red dyeing is substantially more intense than when dyeing is performed without adding thiourea.

*Example 9*

20 parts of the coupling component of the formula

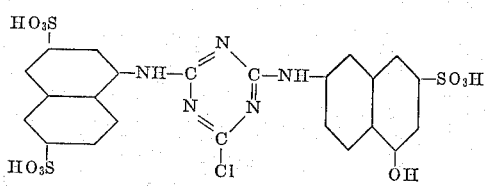

are pasted with 40 parts of a condensation product of 1 mol of coconut oil fatty acid and 2 mols of diethanolamine and the paste is dissolved in 200 parts of hot water. A solution of 500 parts of urea in 200 parts of water is then added and the whole is made up with water to 1000 parts by volume.

A woollen fabric is padded with this liquor, then immediately reeled and stored in this state for 14 hours at 30° C. After this storage the fabric is rinsed for a short time and the dyeing is developed for 10 minutes in a solution (heated at 30° C.) containing per 1000 parts of water 2 parts of diazotized meta-chloroaniline, then once more rinsed in warm water and soaped with heating.

The resulting orange-red shade is much deeper than when dyeing is performed without adding urea.

*Example 10*

30 parts of the dyestuff of the formula

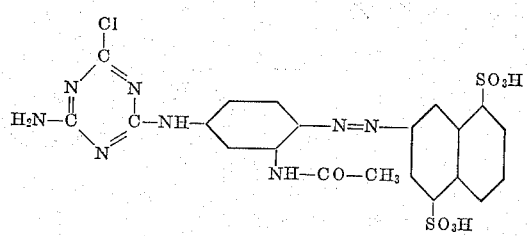

are dissolved in 300 parts of boiling water together with 100 parts of thiourea. The resulting solution is cooled with 300 parts of cold water to 40° C.; 200 parts of a 10% sodium carbonate solution are added, and the whole is diluted with water to 1000 parts by volume.

A silk fabric is padded with this liquor to a weight increase of 90%, then immediately reeled and stored in this state for 14 hours at 30° C. in a closed container or wrapped in a plastic foil. After this storage the unfixed portion of dyestuff is removed by a good rinse in cold and in hot water.

The resulting yellow shade is much more intense than when dyeing is performed in the absence of thiourea.

The time required for the fixation can be substantially shortened when 0.2 part of N:N-dimethylhydrazine is added per 1000 parts of liquor.

*Example 11*

30 parts of the dyestuff of the formula

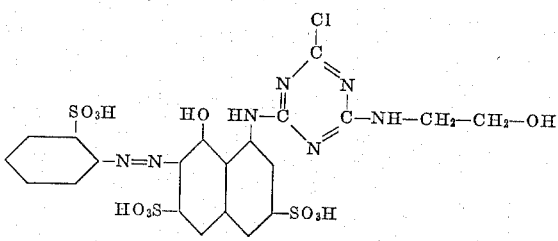

are dissolved in 600 parts of boiling water together with 40 parts of the acid sulfuric acid ester of an adduct of 2 mols of ethylene oxide with 1 mol of para-tertiary nonylphenol, 5 parts of a 25% aqueous solution of an adduct of 8 mols of ethylene oxide with 1 mol of para-tertiary octylphenol and 200 parts of thiosemicarbazide. The whole is then diluted with cold water to 1000 parts by volume and cooled to 30° C.

A chlorinated woollen fabric is padded with this liquor, immediately afterwards reeled and stored in this state for 1 hour at 30° C. in a closed container or wrapped in a plastic foil, then thoroughly rinsed in cold and then in hot water.

The resulting strong red shade is much more intense than when dyeing is carried out in the absence of thiosemicarbazide.

Similar good results are also obtained when thiourea is used instead of thiosemicarbazide.

*Example 12*

A padding liquor is prepared from 30 parts of the complex chromium dyestuff containing per atomic proportion of chromium one molecule each of the dyestuffs of the formulae

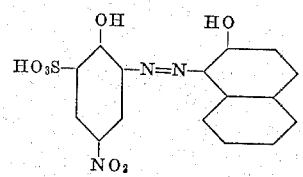

and

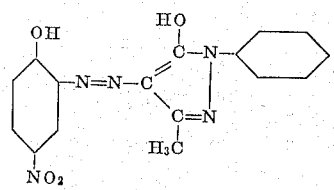

40 parts of a condensation product of 1 mol of coconut oil fatty acid and 2 mols of diethanolamine
100 parts of thiourea
300 parts of urea and
530 parts of water.

A woollen fabric is padded with this liquor at 40° C., reeled and stored in this state for 36 hours at 30° C., then thoroughly rinsed in hot water.

A brown dyeing is obtained which is of much greater tinctorial strength than when dyeing is performed in the absence of the combination of ureathiourea.

*Example 13*

100 parts of wool yarn are dyed in a bath containing per 4000 parts of water 3 parts of the dyestuff of the formula $$\text{SO}_3\text{H}-\underset{\underset{\text{HO}_3\text{S}}{|}}{\bigcirc}-\text{N}=\text{N}-\underset{\underset{\text{SO}_3\text{H}}{|}}{\bigcirc\bigcirc}\underset{\text{HO NH}}{-}-\text{C}\underset{\text{N}}{\overset{\text{N}}{\diagup}}\overset{\overset{\text{Cl}}{|}}{\underset{\text{C}}{\text{C}}}\overset{\text{N}}{\diagdown}\text{C}-\text{NH}-\text{CH}_2-\text{CH}_2-\text{OH}$$

200 parts of thiourea and 2 parts of a 25% solution of an adduct of 8 mols of ethylene oxide with 1 mol of para-tertiary octylphenol. The yarn is dyed for 3 hours at 40° C. and then thoroughly rinsed in cold and then in hot water.

A fast red dyeing is obtained which has much greater tinctorial strength than when dyeing is performed without adding thiourea.

*Example 14*

100 parts of a rabbit pelt are dyed in a bath containing in 200 parts of water 4 parts of the dyestuff of the formula $$\text{SO}_3\text{H}-\underset{\underset{\text{HO}_3\text{S}}{|}}{\bigcirc}-\text{N}=\text{N}-\underset{\underset{\text{SO}_3\text{H}}{|}}{\bigcirc\bigcirc}\underset{\text{HO NH}}{-}-\text{C}\underset{\text{N}}{\overset{\text{N}}{\diagup}}\overset{\overset{\text{Cl}}{|}}{\underset{\text{C}}{\text{C}}}\overset{\text{N}}{\diagdown}\text{C}-\text{NH}-\text{CH}_2-\text{CH}_2-\text{OH}$$

20 parts of sodium benzoate and 8 parts of the acid sulfuric acid ester of an adduct of 2 mols of ethylene oxide with 1 mol of para-tertiary nonylphenol. The pelt is dyed for 5 hours at 30° C. in a slowly revolving container and then vigorously rinsed.

A red dyeing of the pelt is obtained which is of much greater tinctorial strength than when sodium benzoate is omitted in dyeing.

Similar good results are obtained on other pelts.

*Example 15*

100 parts of chicken feathers are immersed for 14 hours in a bath, heated at 30° C., containing in 2000 parts of water 20 parts of the dyestuff of the formula $$\text{SO}_3\text{H}-\underset{\underset{\text{HO}_3\text{S}}{|}}{\bigcirc}-\text{N}=\text{N}-\underset{\underset{\text{SO}_3\text{H}}{|}}{\bigcirc\bigcirc}\underset{\text{HO HN}}{-}-\text{C}\underset{\text{N}}{\overset{\text{N}}{\diagup}}\overset{\overset{\text{Cl}}{|}}{\underset{\text{C}}{\text{C}}}\overset{\text{N}}{\diagdown}\text{C}-\text{NH}-\text{CH}_2-\text{CH}_2-\text{OH}$$

300 parts of thioacetamide and 80 parts of the acid sulfuric acid ester of an adduct of 2 mols of ethylene oxide with 1 mol of para-tertiary nonylphenol. The feathers are then carefully rinsed and dried in air.

The feathers are dyed an intense red shade. Without thioacetamide the dyestuff exhaustion is of a much lesser order.

*Example 16*

A padding liquor is prepared from 30 parts of the dyestuff of the formula $$\text{SO}_3\text{H}-\underset{\underset{\text{HO}_3\text{S}}{|}}{\bigcirc}-\text{N}=\text{N}-\underset{\underset{\text{SO}_3\text{H}}{|}}{\bigcirc\bigcirc}\underset{\text{HO NH}}{-}-\text{C}\underset{\text{N}}{\overset{\text{N}}{\diagup}}\overset{\text{N}}{\underset{\underset{\text{Cl}}{|}}{\text{C}}}\overset{\text{N}}{\diagdown}\text{C}-\text{NH}-\text{CH}_2-\text{CH}_2-\text{OH}$$

100 parts of thiourea
200 parts of urea
40 parts of the acid sulfuric acid ester of an adduct of 2 mols of ethylene oxide with 1 mol of para-tertiary nonylphenol
20 parts of sodium carbonate
0.3 part of 1:4-diaza-bicyclo(2:2:2)octane and
609.7 parts of water.

A woollen fabric is padded with this liquor and then stored in the reeled state for 14 hours at 30° C. After this storage, the fabric is vigorously rinsed in cold and then in warm water. The resulting red shade has good fastness to wet processing.

Similar good results are obtained when 1:4-diaza-bicyclo(2:2:2)octane is replaced by equal parts of N:N-dimethylhydrazine.

*Example 17*

A padding liquor is prepared from 40 parts of the dyestuff of the formula

[Anthraquinone dyestuff structure with NH₂, SO₃H, and triazine-linked cyclohexyl-SO₃H substituents with Cl on triazine]

100 parts of thiourea
300 parts of urea
20 parts of the acid sulfuric acid ester of the adduct of 2 mols of ethylene oxide with 1 mol of para-tertiary nonylphenol
25 parts of 30% sodium hydroxide solution
10 parts of calcined sodium sulfate and
505 parts of water.

A woollen fabric is padded with this liquor, then reeled and stored for 14 hours at 30° C. After this storage, the fabric is rinsed in cold water and then treated for 10 minutes at 40° C. in a bath containing in 1000 parts of water 5 parts of 85% formic acid. The fabric is then finished off by being vigorously rinsed in cold and then in warm water. A strong blue shade is obtained which has good fastness to wet processing.

The above-mentioned dyestuff can be replaced by equal parts of one of the dyestuffs of the following formulae

[Red dyestuff structure]

[Yellow dyestuff structure]

[Violet dyestuff structure]

sulfonated with monohydrate or oleum (cf. Color Index 44055) chromium complex containing per atomic proportion of chromium 2 molecules of the dyestuff of the formula

[red dyestuff structure]

*Example 18*

A padding liquor is prepared from 30 parts of the dyestuff of the formula 100 parts of thiourea
200 parts of urea
20 parts of the acid sulfuric acid ester of the adduct of 2 mols of ethylene oxide with 1 mol of para-tertiary nonylphenol
650 parts of water.

A woollen fabric is padded with this liquor, then reeled and stored for 6 hours at 20° C., finally vigorously rinsed in cold and in warm water. A fast yellow shade is obtained.

*Example 19*

A padding liquor is prepared from 20 parts of the dyestuff of the formula

[dyestuff structure]

100 parts of thiourea
300 parts of urea
20 parts of the acid sulfuric acid ester of an adduct from 2 mols of ethylene oxide with 1 mol of para-tertiary nonylphenol
20 parts of chromium fluoride
25 parts of 85% formic acid and
515 parts of water.

A woollen fabric is padded with this liquor, then reeled and stored in this state for 24 hours at 30° C., and then thoroughly rinsed in cold and in warm water. The resulting strong blue dyeing has good general properties of fastness.

Similar good results are obtained when the above dyestuff is replaced by equal parts of one of the dyestuffs of the following formulae:

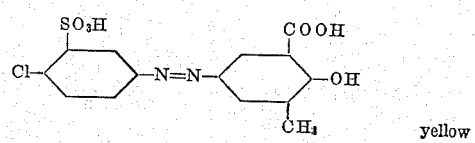

yellow

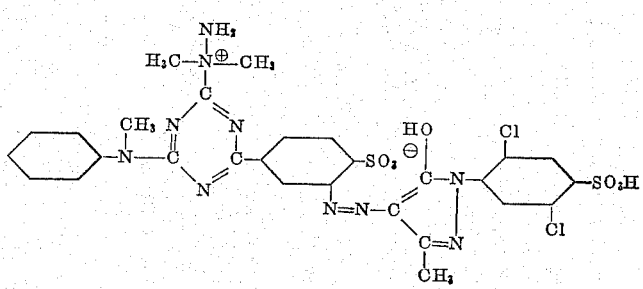

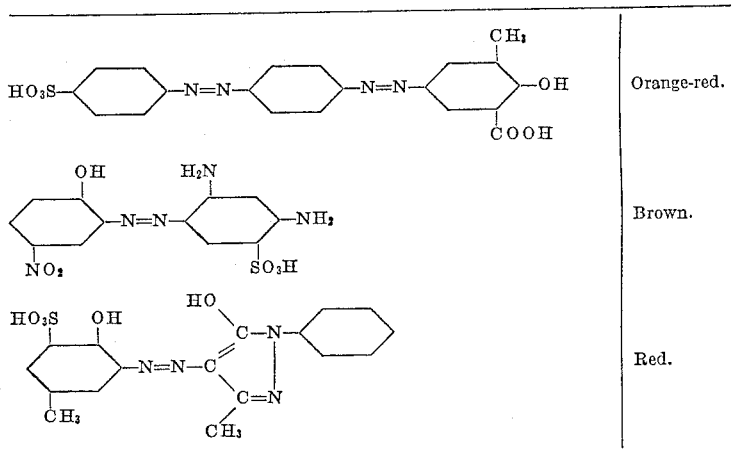

| | |
|---|---|
| | Orange-red. |
| | Brown. |
| | Red. |

Example 20

A padding liquor is prepared from 20 parts of the complex cobalt dyestuff containing for every atomic proportion of cobalt 2 molecules of the dyestuff of the formula

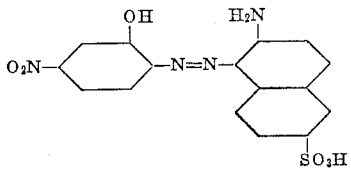

100 parts of thiourea
300 parts of urea
40 parts of the acid sulfuric acid ester of an adduct from 2 mols of ethylene oxide with 1 mol of para-tetriary nonylphenol and
540 parts of water.

A woollen fabric is padded with this liquor, then reeled and stored for 14 hours at 30° C. and finally thoroughly rinsed in cold and in warm water. A bluish-grey shade is obtained.

Similar good results are obtained when the above dyestuff is replaced by equal parts of the complex dyestuff which contains per atomic proportion of chromium 2 molecules of the dyestuff of the formula

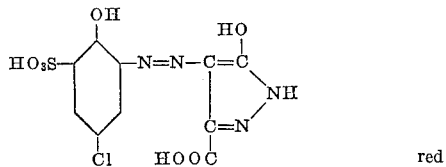 red

Example 21

A padding liquor is prepared from 30 parts of the dyestuff of the formula

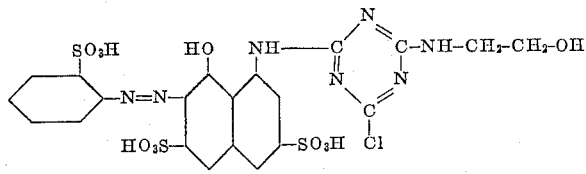

200 parts of formamide
20 parts of the acid sulfuric acid ester of an adduct from 2 mols of ethylene oxide and 1 mol of para-tertiary nonylphenol and
750 parts of water.

A woollen fabric is padded with this liquor, squeezed to a weight increase of 75%, then reeled and thus stored for 14 hours at 30° C. The resulting fast red dyeing is substantially stronger than when no formamide is added.

Similar good results are obtained when formamide is replaced by N-methylformamide or N:N-dimethylformamide.

Example 22

To a padding liquor prepared as described in Example 3 there are further added 40 parts of the mothproofing agent of the formula

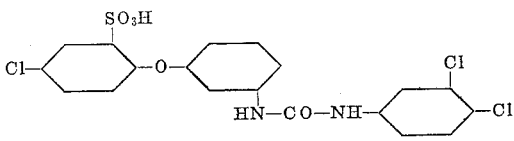

Otherwise, the procedure is the same as that of Example 3. A woollen fabric of green color is obtained which is at the same time mothproofed.

What is claimed is:

1. Process for coloring wool with a dyestuff selected from the group consisting of acid wool dyes, reactive dyes and metal complex dyes which are absorbed from an acid to neutral dyebath, which process comprises treating said wool at a temperature from 15 to 40° C. with an aqueous preparation containing said dyestuff and at least 5%, calculated on the whole preparation, of at least one compound of the formula

wherein

D is a member selected from the group consisting of oxygen, sulfur and the grouping NH,
Y is a member selected from the group consisting of a primary, secondary and tertiary amino group, an O⁻ and an S⁻ and
Z is a member selected from the group consisting of a primary, secondary and tertiary amino group, an alkyl, alkoxy and aryl group;

and then subjecting the material so-treated in the wet state to a storage of at least one hour at 15 to 40° C.

2. Process for coloring wool comprising treating said wool at a temperature from 15 to 40° C. with an aqueous preparation containing an acid wool dyestuff and at least 5%, calculated on the whole preparation, of urea; and then subjecting the material so-treated in the wet state to a storage of at least one hour at 15 to 40° C.

3. Process for coloring wool comprising treating said wool at a temperature from 15 to 40° C. with an aqueous preparation containing an acid wool dyestuff and at least 5%, calculaed on the whole preparation, of thiourea; and then subjecting the material so-treated in the wet state to a storage of at least one hour at 15 to 40° C.

4. Process for coloring wool comprising treating said wool at a temperature from 15 to 40° C. with an aqueous preparation containing an acid wool dyestuff and at least 5%, calculated on the whole preparation, of a mixture of urea and thiourea; and then subjecting the material so-treated in the wet state to a storage of at least one hour at 15 to 40° C.

5. Process for coloring wool comprising treating said wool at a temperature from 15 to 40° C. with an aqueous preparation containing an acid wool dyestuff and at least 5%, calculated on the whole preparation, of a sodium benzoate; and then subjecting the material so-treated in the wet state to a storage of at least one hour at 15 to 40° C.

6. Process for coloring wool comprising treating said wool at a temperature from 15 to 40° C. with an aqueous preparation containing an acid wool dyestuff and at least 5%, calculated on the whole preparation, of dicyandiamide; and then subjecting the material so-treated in the wet state to a storage of at least one hour at 15 to 40° C.

7. Process for coloring wool comprising treating said wool at a temperature from 15 to 40° C. with an aqueous preparation containing an acid wool dyestuff and at least 5%, calculated on the whole preparation, of thioacetamide; and then subjecting the material so-treated in the wet state to a storage of at least one hour at 15 to 40° C.

8. Process for coloring wool comprising treating said wool at a temperature from 15 to 40° C. with an aqueous preparation containing an acid wool dyestuff and at least 5%, calculated on the whole preparation, of biuret; and then subjecting the material so-treated in the wet state to a storage of at least one hour at 15 to 40° C.

9. Process for coloring wool comprising treating said wool at a temperature from 15 to 40° C. with an aqueous preparation containing an acid wool dyestuff and at least 5%, calculated on the whole preparation, of a mixture of urea and thiourea and a coacervating agent; and then subjecting the material so-treated in the wet state to a storage of at least one hour at 15 to 40° C.

10. Process for coloring wool comprising treating said wood at a temperature from 15 to 40° C. with an aqueous preparation containing an acid wool dyestuff and at least 5%, calculated on the whole preparation, of a mixture of urea and thiourea and a non-ionic surface-active agent; and then subjecting the material so-treated in the wet state to a storage of at least one hour at 15 to 40° C.

11. Process for coloring wool comprising treating said wool at a temperature from 15 to 40° C. with an aqueous preparation containing an acid wool dyestuff and at least 5%, calculated on the whole preparation, of a mixture of urea and thiourea, a coacervating and a non-ionic surface-active agent; and then subjecting the material so-treated in the wet state to a storage of at least one hour at 15 to 40° C.

12. Process for coloring wool comprising treating said wool at a temperature from 15 to 40° C. with an aqueous preparation containing an acid wool dyestuff and at least 5%, calculated on the whole preparation, of a mixture of urea and thiourea, a coacervating and non-ionic surface-active agent and a moth-proofing agent; and then subjecting the material so-treated in the wet state to a storage of at least one hour at 15 to 40° C.

13. Process for coloring wool comprising treating said wool at a temperature from 15 to 40° C. with an aqueous preparation containing a reactive dyestuff and at least 5%, calculated on the whole preparation, of urea; and then subjecting the material so-treated in the wet state to a storage of at least one hour at 15 to 40° C.

14. Process for coloring wool comprising treating said wool at a temperature from 15 to 40° C. with an aqueous preparation containing a reactive dyestuff and at least 5%, calculated on the whole preparation, of thiourea; and then subjecting the material so-treated in the wet state to a storage of at least one hour at 15 to 40° C.

15. Process for coloring wool comprising treating said wool at a temperature from 15 to 40° C. with an aqueous preparation containing a reactive dyestuff and at least 5%, calculated on the whole preparation, of a mixture of urea and thiourea; and then subjecting the material so-treated in the wet state to a storage of at least one hour at 15 to 40° C.

16. Process for coloring wool comprising treating said wool at a temperature from 15 to 40° C. with an aqueous preparation containing a reactive dyestuff and at least 5%, calculated on the whole preparation, of sodium benzoate; and then subjecting the material so-treated in the wet state to a storage of at least one hour at 15 to 40° C.

17. Process for coloring wool comprising treating said wool at a temperature from 15 to 40° C. with an aqueous preparation containing a reactive dyestuff and at least 5%, calculated on the whole preparation, of dicyandiamide; and then subjecting the material so-treated in the wet state to a storage of at least one hour at 15 to 40° C.

18. Process for coloring wool comprising treating said wool at a temperature from 15 to 40° C. with an aqueous preparation containing a reactive dyestuff and at least 5%, calculated on the whole preparation, of thioacetamide; and then subjecting the material so-treated in the wet state to a storage of at least one hour at 15 to 40° C.

19. Process for coloring wool comprising treating said wool at a temperature from 15 to 40° C. with an aqueous preparation containing a reactive dyestuff and at least 5%, calculated on the whole preparation, of biuret; and then subjecting the material so-treated in the wet state to a storage of at least one hour at 15 to 40° C.

20. Process for coloring wool comprising treating said wool at a temperature from 15 to 40° C. with an aqueous preparation containing a reactive dyestuff and at least 5%, calculated on the whole preparation, of a mixture of urea and thiourea and a coacervating agent; and then subjecting the material so-treated in the wet state to a storage of at least one hour at 15 to 40° C.

21. Process for coloring wool comprising treating said wool at a temperature from 15 to 40° C. with an aqueous preparation containing a reactive dyestuff and at least 5%, calculated on the whole preparation, of a mixture of urea and thiourea and a non-ionic surface-active agent; and then subjecting the material so-treated in the wet state to a storage of at least one hour at 15 to 40° C.

22. Process for coloring wool comprising treating said wool at a temperature from 15 to 40° C. with an aqueous preparation containing a reactive dyestuff and at least 5%, calculated on the whole preparation, of a mixture of urea and thiourea, a coacervating and a non-ionic surface-active agent; and then subjecting the material so-treated in the wet state to a storage of at least one hour at 15 to 40° C.

23. Process for coloring wool comprising treating said wool at a temperature from 15 to 40° C. with an aqueous preparation containing a metal complex dyestuff which is absorbed from an acid to neutral dye bath and at least 5%, calculated on the whole preparation, of urea; and then subjecting the material so-treated in the wet state to a storage of at least one hour at 15 to 40° C.

24. Process for coloring wool comprising treating said wool at a temperature from 15 to 40° C. with an aqueous prepartion containing a metal complex dyestuff which is absorbed from an acid to neutral dye bath and at least 5%, calculated on the whole prepartion, of thiourea; and then subjecting the material so-treated in the wet state to a storage of at least one hour at 15 to 40° C.

25. Process for coloring wool comprising treating said wool at a temperature from 15 to 40° C. with an aqueous preparation containing a metal complex dyestuff which is absorbed from an acid to neutral dye bath and at least 5%, calculated on the whole preparation, of a mixture of urea and thiourea; and then subjecting the material so-treated in the wet state to a storage of at least one hour at 15 to 40° C.

26. Process for coloring wool comprising treating said wool at a temperature from 15 to 40° C. with an aqueous preparation containing a metal complex dyestuff which is absorbed from an acid to neutral dye bath and at least 5%, calculated on the whole preparation, of sodium benzoate; and then subjecting the material so-treated in the wet state to a storage of at least one hour at 15 to 40° C.

27. Process for coloring wool comprising treating said wool at a temperature from 15 to 40° C. with an aqueous preparation containing a metal complex dyestuff which is absorbed from an acid to neutral dye bath and at least 5%, calculated on the whole preparation, of dicyandiamide; and then subjecting the material so-treated in the wet state to a storage of at least one hour at 15 to 40° C.

28. Process for coloring wool comprising treating said wool at a temperature from 15 to 40° C. with an aqueous preparation containing a metal complex dyestuff which is absorbed from an acid to neutral dye bath and at least 5%, calculated on the whole preparation, of thioacetamide; and then subjecting the material so-treated in the wet state to a storage of at least one hour at 15 to 40° C.

29. Process for coloring wool comprising treating said wool at a temperature from 15 to 40° C. with an aqueous preparation containing a metal complex dyestuff which is absorbed from an acid to neutral dye bath and at least 5%, calculated on the whole preparation, of biuret; and then subjecting the material so-treated in the wet state to a storage of at least one hour at 15 to 40° C.

30. Process for coloring wool comprising treating said wool at a temperature from 15 to 40° C. with an aqueous preparation containing a metal complex dyestuff which is absorbed from an acid to neutral dye bath and at least 5%, calculated on the whole preparation, of a mixture of urea and thiourea and a coacervating agent; and then subjecting the material so treated in the wet state to a storage of at least one hour at 15 to 40° C.

31. Process for coloring wool comprising treating said wool at a temperature from 15 to 40° C. with an aqueous preparation containing a metal complex dyestuff which is absorbed from an acid to neutral dye bath and at least 5%, calculated on the whole preparation, of a mixture of urea and thiourea and a non-ionic surface-active agent; and then subjecting the material so-treated in the wet state to a storage of at least one hour at 15 to 40° C.

32. Process for coloring wool comprising treating said wool at a temperature from 15 to 40° C. with an aqueous preparation containing a metal complex dyestuff which is absorbed from an acid to neutral dye bath and at least 5%, calculated on the whole preparation, of a mixture of urea and thiourea a coacervating and a non-ionic surface-active agent; and then subjecting the material so-treated in the wet state to a storage of at least one hour at 15 to 40° C.

References Cited

UNITED STATES PATENTS

| | | |
|---|---|---|
| 3,183,224 | 5/1965 | Benz et al. |
| 3,208,990 | 9/1965 | Benz et al. |
| 3,211,514 | 10/1965 | Casty et al. _____ 8—54 X |
| 3,223,470 | 12/1965 | Boedeker et al. _____ 8—39 |

FOREIGN PATENTS

| | | |
|---|---|---|
| 762,985 | 4/1934 | France. |
| 1,196,948 | 11/1959 | France. |
| 1,273,731 | 9/1961 | France. |

J. TRAVIS BROWN, *Acting Primary Examiner.*

NORMAN G. TORCHIN, *Examiner.*

T. J. HERBERT, Jr., *Assistant Examiner.*